United States Patent [19]

Inui

[11] Patent Number: 5,208,676
[45] Date of Patent: May 4, 1993

[54] IMAGE PROCESSING APPARATUS WITH DATA STORAGE REGION MANAGEMENT, MEMORY SPACE ALLOCATION IN ACCORDANCE WITH DETECTED COMPRESSION RATIO OF DATA

[75] Inventor: Tetsuyuki Inui, Kanagawa, Japan
[73] Assignee: Fuji Xerox Co., Ltd., Tokyo, Japan
[21] Appl. No.: 621,810
[22] Filed: Dec. 4, 1990
[51] Int. Cl.$^5$ .............................................. H04N 1/21
[52] U.S. Cl. ................................... 358/296; 358/404; 358/444; 395/114; 395/115
[58] Field of Search .................... 358/296, 404, 444; 395/114, 115

[56] References Cited

U.S. PATENT DOCUMENTS 4,719,514  1/1988  Kurahayashi ...................... 358/404
4,967,288  10/1990  Mizutori ............................. 358/404

Primary Examiner—Benjamin R. Fuller
Assistant Examiner—Scott A. Rogers
Attorney, Agent, or Firm—Finnegan, Henderson, Farabow, Garrett & Dunner

[57] ABSTRACT

An image recording apparatus comprises an external image data input section, an image reading section for reading images of documents, a data compressor for compressing image data read by the image reading section, a data storage unit for storing the image data compressed by the data compressor, a storage region manager for managing storage regions in the data storage unit for the external image data of the external image data input section and for the image data read by the image reading section, a compression ratio detector for detecting the compression ratio of the image data read by the image reading section and compressed by the data compressor, and a control unit for changing the storage region in the data storage unit for the image data read by the image reading section in accordance with the compression ratio detected by the compression ratio detector.

20 Claims, 8 Drawing Sheets

| | MEMORY CAPACITY | $A_{22}$ | $A_{21}$ | $A_{20}$ | $A_{19}$ |
|---|---|---|---|---|---|
| PC | 1M | 0 | 0 | 0 | NA |
| FAX | 1M | 0 | 0 | 1 | NA |
| SCANNER 1 | 2M | 0 | 1 | NA | NA |
| SCANNER 2 | 4M | 1 | NA | NA | NA |

IMAGE PROCESSING APPARATUS WITH DATA STORAGE REGION MANAGEMENT, MEMORY SPACE ALLOCATION IN ACCORDANCE WITH DETECTED COMPRESSION RATIO OF DATA

BACKGROUND OF THE INVENTION

1. Field of the Invention

The present invention relates to an image processing apparatus for use in an image recording apparatus such as a digital copying machine or the like, in which an image on a document is read and stored once. The stored image information may then be read out and printed. Particularly, the present invention relates to an image processing apparatus for use in an image recording apparatus of the so-called multi-function type having an image copying function, an image communication function as a facsimile machine, a function as a printer for outputting information from a host computer, a personal computer, etc.

2. Discussion of the Related Art

Recently, with the spread of personal computers and word processors, etc., reproducible image information has become copious and diverse. Consequently, copying machines generating higher quality copies have been manufactured. In addition, copying machines have been made that provide a variety of functions, for example, selection of the number of copies to be made and reduction/enlargement.

Other functions have also been required in a copying machine. For example, an electronic recirculating document handler (hereinafter abbreviated to "electronic RDH") function in which each of a plurality of documents are copied onto a desired number of sheets, provided that the documents are sorted properly. A book-binding function has been implemented in which images of a plurality of documents are suitably edited and copied in a manner so that images of two documents are copied on each of opposite surfaces of each sheet of recording paper so as to divide each surface into two pages. Subsequently, all the sheets of recording paper on which images of all the documents have been copied are stacked. Lastly, the stack of sheets of recording paper are bound at the center thereof and doubled into one booklet in which the copies of the documents are arranged in the order of pages.

Copying machines have also been required to function as an image communication system (i.e. a facsimile machine), and as a printer for outputting information from a host computer, a personal computer, etc.

Figure 10:
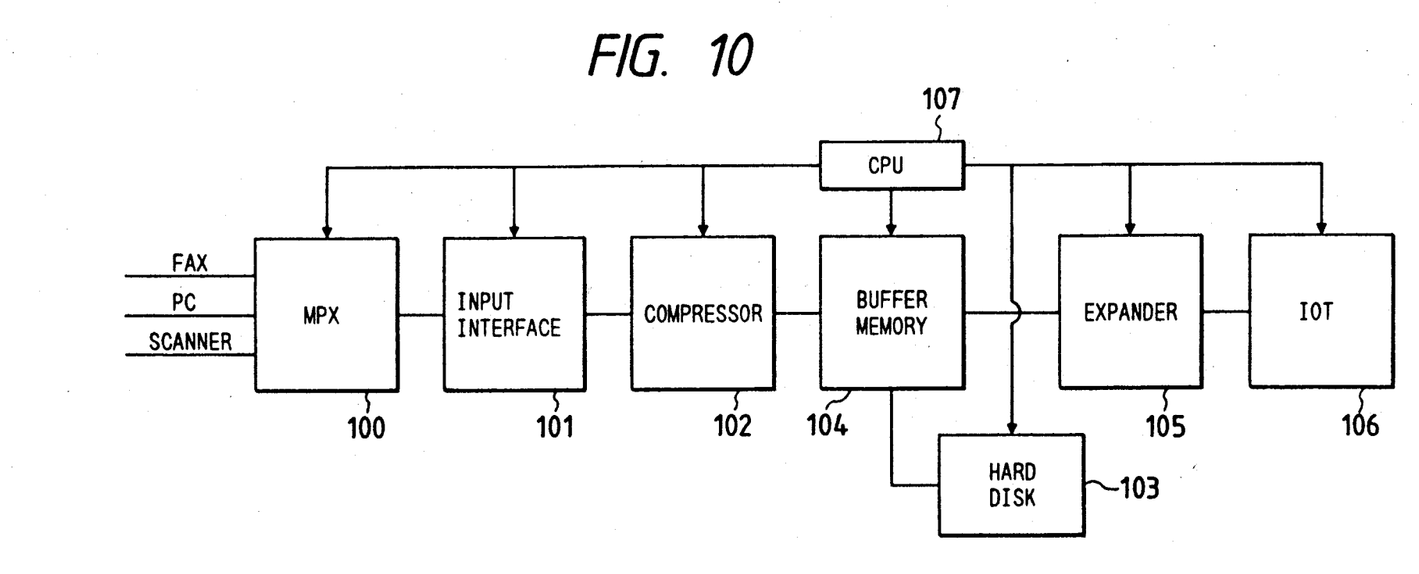
FIG. 10 is a block diagram showing a conventional image processing apparatus.
Figure 11:
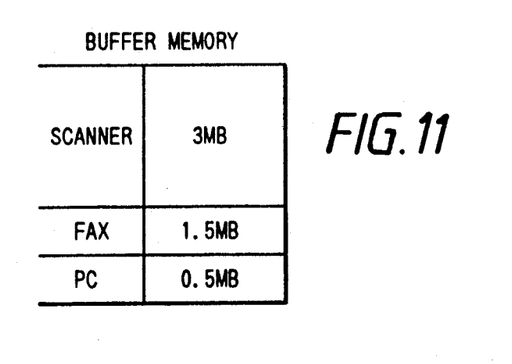
FIG. 11 is an explanatory view showing the state of the buffer memory in which the storage region is distributed.

Conventionally, digital copying machines have been made that incorporate the above functions. In a conventional digital copying machine, documents are set in an automatic document feeder (hereinafter abbreviated to "ADF"), and the documents are automatically and successively fed by the ADF onto a platen of the copying machine so that the image on each document is read by a scanner and stored in a storage device after it is converted into an electric signal. As shown in FIG. 10, image information read by means the scanner is supplied to a compressor 102 through a multiplexer (hereinafter abbreviated to "MPX") 100 and an input interface 101. The image information supplied to the compressor 102 is compressed by the compressor 102 and then stored in a hard disk 103.

However, since the image transfer rate to the hard disk 103 is low compared to that of the input interface 101 and the compressor 102, it is difficult to transfer the image information compressed in the compressor 102 directly to hard disk 103.

Accordingly, a buffer memory 104 for temporarily storing the image information is provided between the compressor 102 and the hard disk 103 so that, image information is stored in the hard disk 103 with an image information transfer rate that is synchronized by the buffer memory 104 with the storing rate of the hard disk 103.

The above image processing apparatus is arranged so that the image information stored in the hard disk 103 is read out through buffer memory 104. The read-out image information is then expanded by an expander 105. The expanded image information is then subject to secondary processing, as necessary, by means of an image output terminal (hereinafter abbreviated to "IOT") 106, and then the image is recorded and outputted.

In FIG. 10, the reference numeral 107 designates a CPU for controlling the operation of the MPX 100, the input interface 101, the compressor 102, etc.

As described above, the digital copying machine can act as an image communication system (i.e. facsimile machine) and as a printer for outputting information from a host computer, a personal computer, etc. In this digital copying machine, therefore, not only image information supplied from a scanner but also image information supplied from a facsimile machine through a telephone line, information supplied from a host computer, a personal computer, etc., are selectively switched by means of the MPX 100 so as to be inputted in parallel through the input interface 101.

Image information supplied from a facsimile machine, host computer, personal computer, etc., is supplied through input interface 101. This image information is then compressed by compressor 102. The compressed image information can be simultaneously processed in parallel through the buffer memory 104.

In this manner, buffer memory 104 is capable of storing in parallel, under time division, not only image information supplied from a scanner but also image information supplied from a facsimile machine, a personal computer. To this end, the whole storage capacity, for example, 5 MByte, is divided into storage regions in accordance with various functions, for example, 3 MByte for a scanner, 1.5 MByte for a facsimile equipment, and 0.5 MByte for a personal computer.

In the case of the above described conventional digital copying machine, the following problem is encountered. That is, as noted above, the above digital copying machine can function as a facsimile machine, a printer for outputting information from a host computer, a personal computer, etc., in addition to functioning as a copier. Accordingly, the storage region of buffer memory 104 of the image processing apparatus is predeterminedly divided so as to be distributed for scanner use, for facsimile use, for personal computer use, etc. Thus, when image information of a document is read in through a scanner, if the data of the document is read with a low compression ratio to the compressor 102, the amount of image information transferred from compressor 102 to buffer memory 104 is reduced because the storage region portion of buffer memory 104 assigned to the scanner may be full.

In this case, if the read-in operation for the image of the document is continued, image information of the read-in document may be lost because the storage region portion of the buffer memory 104 assigned to the scanner is full. Therefore, in order to overcome this problem the document read-in operation by means of a scanner must be interrupted until a margin is created in the storage region portion of the buffer memory 104 assigned to the scanner. Further, when the document read-in operation is to be restarted, the document on which the read-in operation has been interrupted must be set in the ADF again to be reread. Consequently the document read-in operation becomes difficult.

Further, the document compression ratio of the compressor 102 varies depending on the kind of documents. Also, the rate of use of the storage region portion of the buffer memory 104 assigned to the scanner varies in accordance with the kind of the document to be read in by a scanner. Thus, when document data having a high compression ratio is read in, only a small quantity of the storage region of the buffer memory 104 is used. Consequently, the buffer memory cannot be used efficiently.

In order to solve the former problem, a buffer memory having a sufficiently large storage capacity is provided in advance as the buffer memory 104 to prevent interruption of the document read-in operation because of insufficient storage capacity for the scanner. In this case the problem occurs that the buffer memory 104 becomes expensive to make because of its large capacity. Therefore, it is difficult to reduce the cost of the image processing apparatus. Further, when document data with a high compression ratio is read in, large portions of the buffer memory 104 remain unused for scanner use. Thus, the buffer memory 104 cannot be used efficiently.

SUMMARY OF THE INVENTION

It is therefore an object of the present invention to solve the above problems in the prior art.

It is another object of the present invention to provide a image processing apparatus in which the compression ratio of a document to be read-in by the image processing apparatus is detected in advance so as to make it possible to set the storage regions for use for various functions such as the image processing apparatus, facsimile, etc., in accordance with the detected value of the document compression ratio. Therefore, interruption during the document read-in operation is prevented. Further the storage region of the buffer memory is used more efficiently.

In order to attain the above objects, according to the present invention, the image processing apparatus comprises at least two image input means including image read means for reading-in image information of a document, compressor means for compressing image information supplied from the at least two image input means, temporary storage means having storage regions respectively provided corresponding to the at least two image input means for temporarily storing the image information compressed by the compressor means in the storage regions correspondingly, memory means for storing the compressed image information through the temporary storage means, compression ratio detection means for detecting the compression ratio of the document read-in by the image read-in means, and storage region distribution means for distributing the storage regions in the temporary storage means in accordance with the compression ratio detected by the compression ratio detection means.

The above image input means need not necessarily be a scanner for reading image information of a document, but can be a facsimile machine for outputting image information through a telephone line, a host computer, or a personal computer for outputting an operation result or the like, etc.

As the above storage means, for example, a hard disk, a floppy disk, or the like, may be used.

Further, as the compression ratio detection means and the storage region distribution means, a CPU for controlling image processing operation may be used. However, the present invention is not limited to this and it should be understood that the compression ratio detection means and the storage region distribution means may be constituted by logic circuits or the like.

Further, the detection of the compression ratio of a document read-in by a scanner is carried out by pre-scanning prior to the normal read-in of the document.

In addition, pre-scanning may carried out, for example, in a reduction mode. However, the present invention is not limited to this as pre-scanning may also be carried out in full scale mode.

According to the present invention, the compression ratio of a document read-in by the image input means is detected by the compression ratio detection means and the storage regions of the temporary storage means are properly distributed in accordance with the compression ratio detected by the compression ratio detection means.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

DESCRIPTION OF THE PREFERRED EMBODIMENT

The present invention will be described with reference to an illustrative embodiment.

Figure 1:
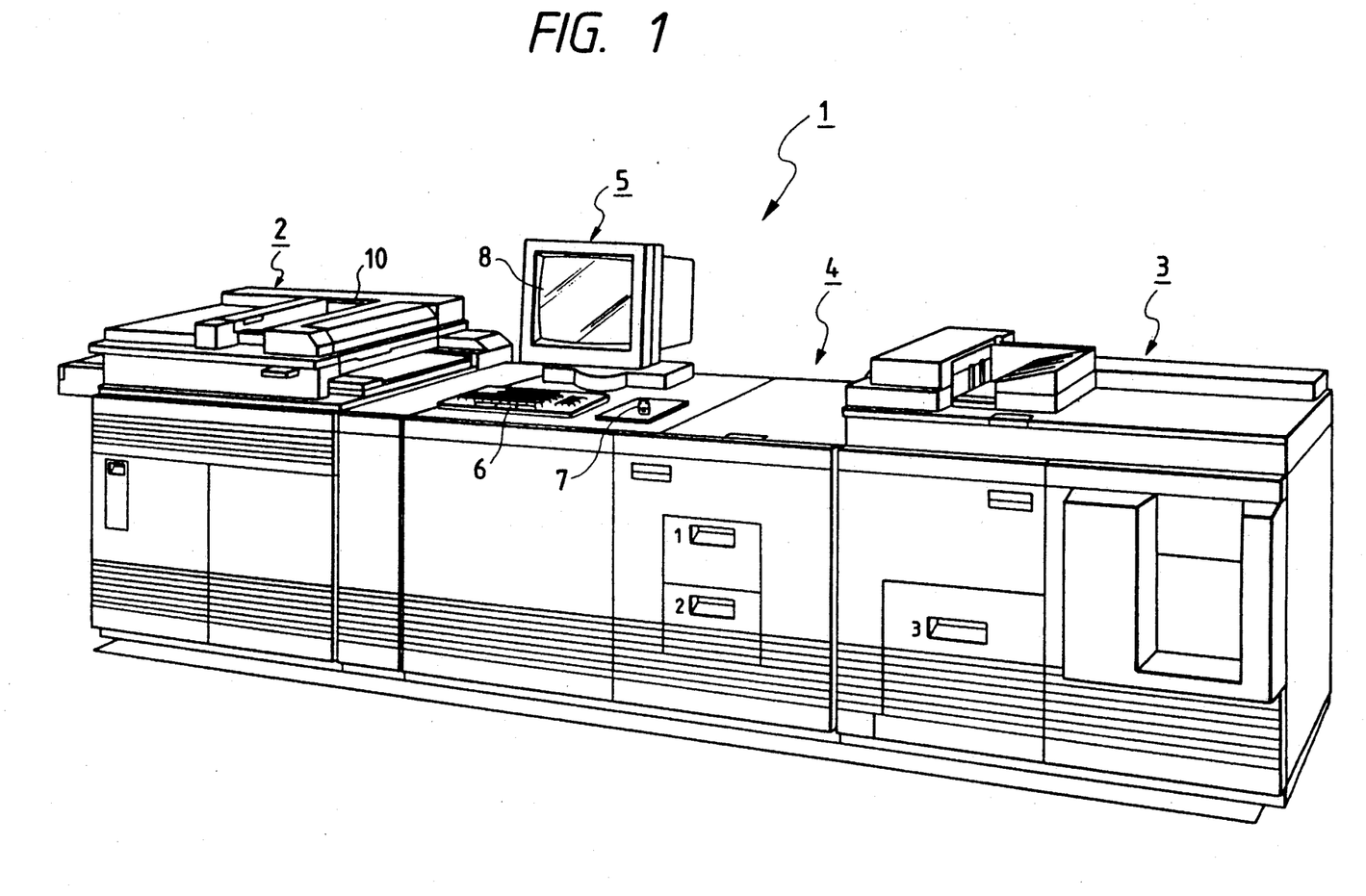
FIG. 1 is a perspective view showing the external appearance of a digital copying machine into which the image processing apparatus related to the present invention is applied.

FIG. 1 is a perspective view showing the exterior of a digital copying machine to which an embodiment of the image processing apparatus according to the present invention is applied.

The digital copying machine is provided with, in addition to the ordinary function of making copies of documents and a function for performing copying on opposite surfaces and multiple copying on one-side surface, an RDH function by which a plurality of document copies are made. Also, a bookbinding function is implemented by which images of a plurality of documents are suitably edited and copied in a manner so that images of two documents are copied on each of opposite surfaces of each sheet of recording paper so as to divide each surface into two pages. All the sheets of recording paper on which images of all the documents have been copied are then stacked. The stack of sheets of recording paper is then bound at the center and doubled into one booklet in which copies of the documents are arranged in the order of the pages.

Further, the digital copying machine has an image communication function as a facsimile machine, a function as a printer for outputting information from a host computer, a personal computer, etc.

Generally, the digital copying machine 1 is constituted by an image input terminal (hereinafter "IIT") 2, an image output terminal "IOT") 3, and a controller "CONT") 4 for controlling the operation of the IIT 2 and IOT 3. The IIT 2 is arranged to read an image of a document, convert the read image into an electric signal, and output the electric signals after performing fundamental processing such as zigzag correction and the like. The IOT 3 is arranged to store the image information supplied from the IIT 2, make copies of the image information after secondary processing, and outputting the image information.

The CONT 4 has a user interface (hereinafter "UI") 5 through which an operator can designate a copying operation, or the like. The UI 5 is provided with a keyboard 6 and a mouse 7 through which an operator can designate a copying operation. The UI 5 also has a display 8 for displaying the contents of the copying operation designated by the operator.

In this embodiment, the IIT 2 is provided at its upper portion with an automatic document feeder (hereinafter "ADF") 10 for automatically feeding a document onto a platen of the IIT 2.

Figure 2:
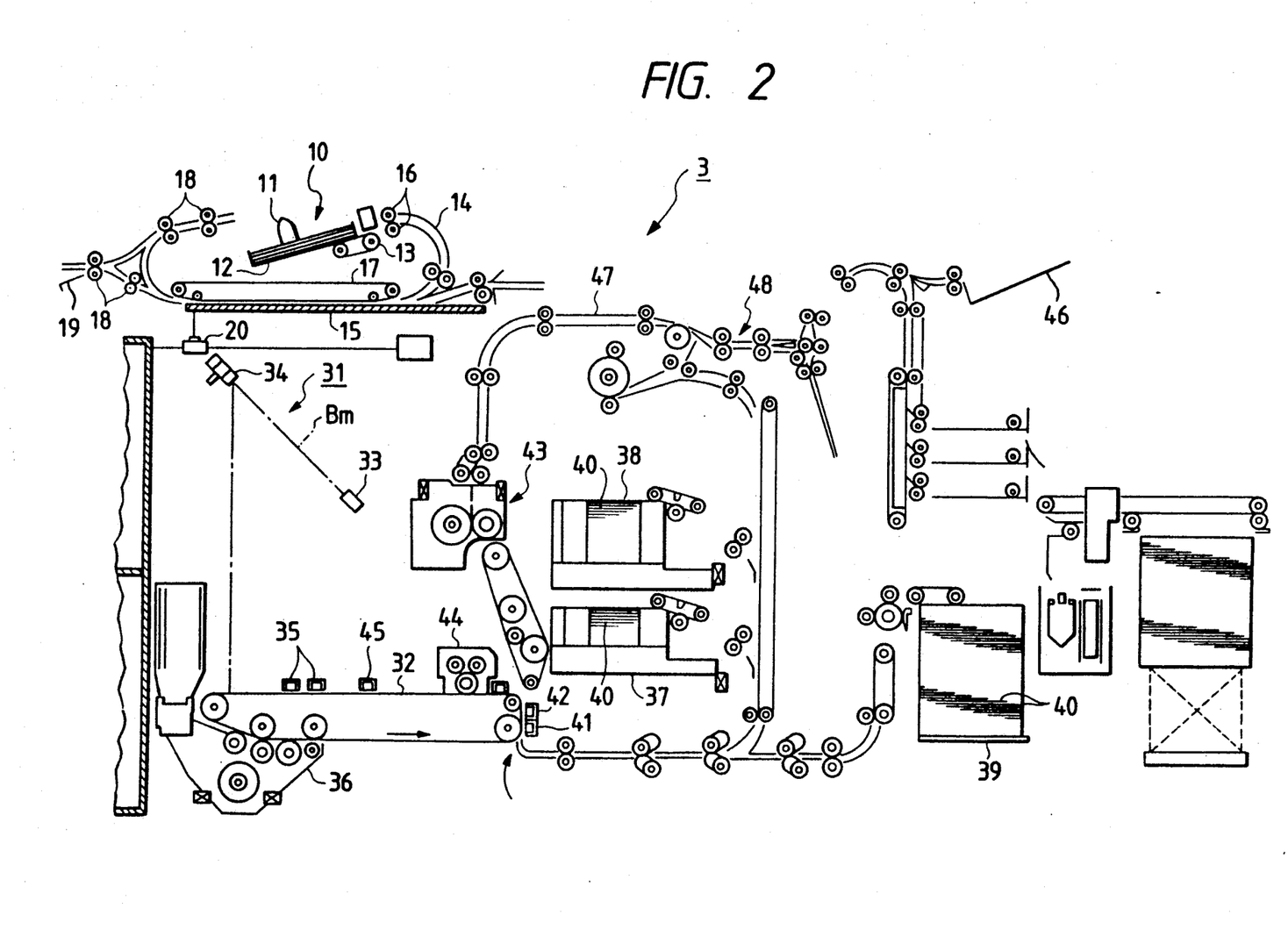
FIG. 2 is a view showing the configuration of the image recording portion of the above digital copying machine.

The ADF 10 is incorporated in a cover unit which covers the top of the platen of the IIT body as shown in FIG. 1. The cover can be opened to reveal the top of the platen of the IIT body. The ADF 10 comprises, as shown in FIG. 2, a document feed tray 12 for accommodating a large number of documents 11, a feed belt 13 for feeding the documents 11 accommodated in the document feed tray 12, conveying rolls 16 for conveying the document 11, which is fed by the feed belt 13, to the platen 15 through a paper shoot 14, a conveyor belt 17 for conveying the document, which is conveyed by the conveying rolls 16 to a document setting position on the platen 15, discharge rolls 18 for discharging the document 11 sent out by the conveyor belt 17 upon the completion of reading the image of the document 11 mounted on the platen 15, and a document receiving tray 19 for accommodating the discharged documents 11.

Figure 3:
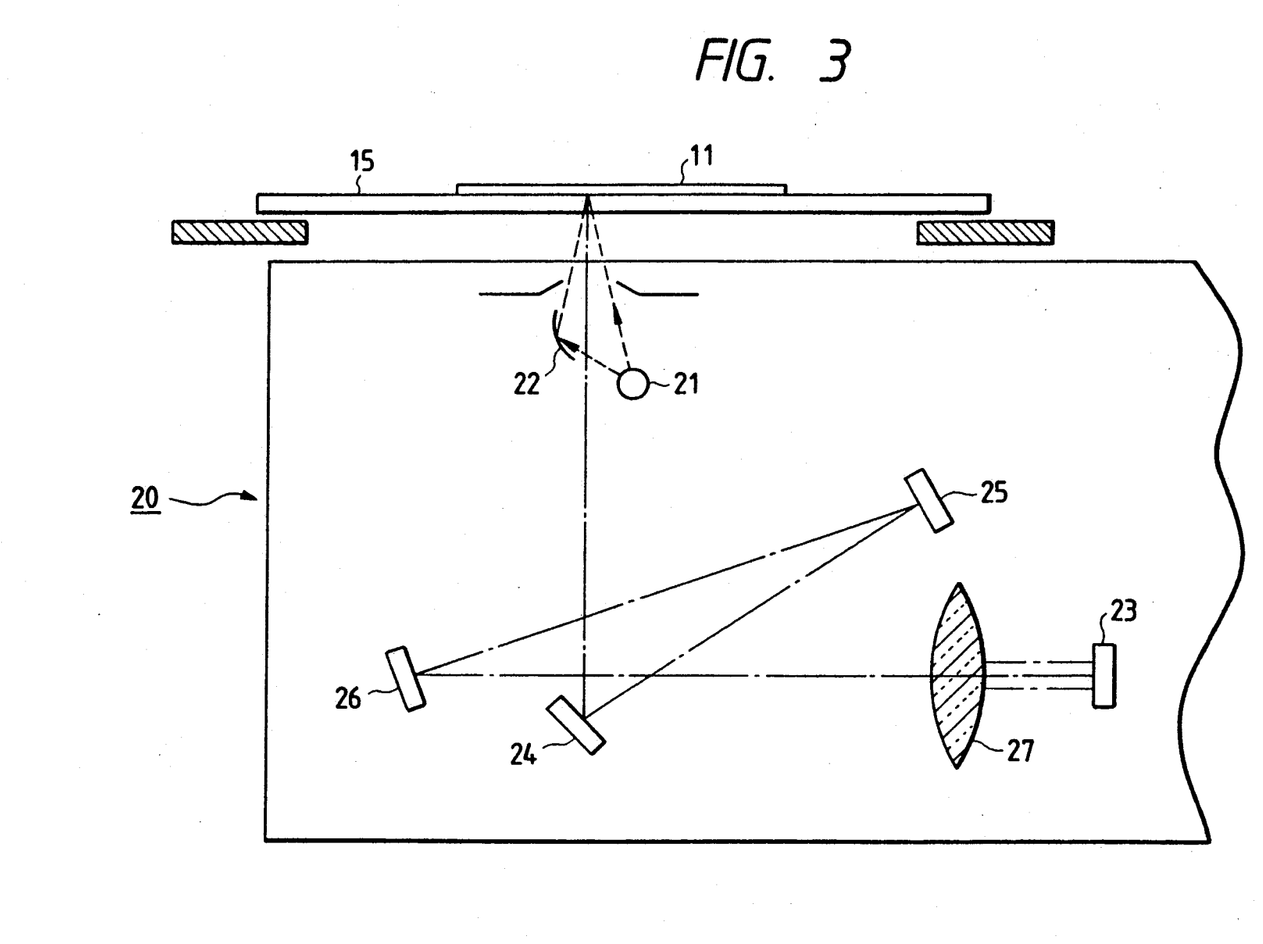
FIG. 3 is a view showing the configuration of a scanner.

The document 11 fed onto the platen 15 of the IIT body by the ADF 10 is read by a scanner 20 of the IIT 2 as shown in FIG. 3. The scanner 20 is provided with a light source 21 for illuminating the document 11 mounted on the platen 15. The scanner 20 further includes a reflection plate 22 for reflecting light from the light source 21 toward the document 11. A plurality of mirrors 24, 25, and 26 are provided for reflecting light from the document 11 to an image sensor array 23 constituted by CCDs or the like. A lens 27 focuses the image carrying light led by the mirrors 24, 25, and 26 onto the image sensor array 23. The light source 21, the mirrors 24, 25, and 26, the image sensor array 23, and the like are integrally assembled as the scanner 20 as shown in FIG. 2.

The scanner 20 is driven by a drive mechanism (not shown) so as to be reciprocatable below the platen 15 in the sub-scanning direction. Further, the scanner 20 is arranged to read the image of the document 11 mounted on the platen 15 by means of the image sensor array 23 while moving below the platen 15 in the subscanning direction.

Figure 4:
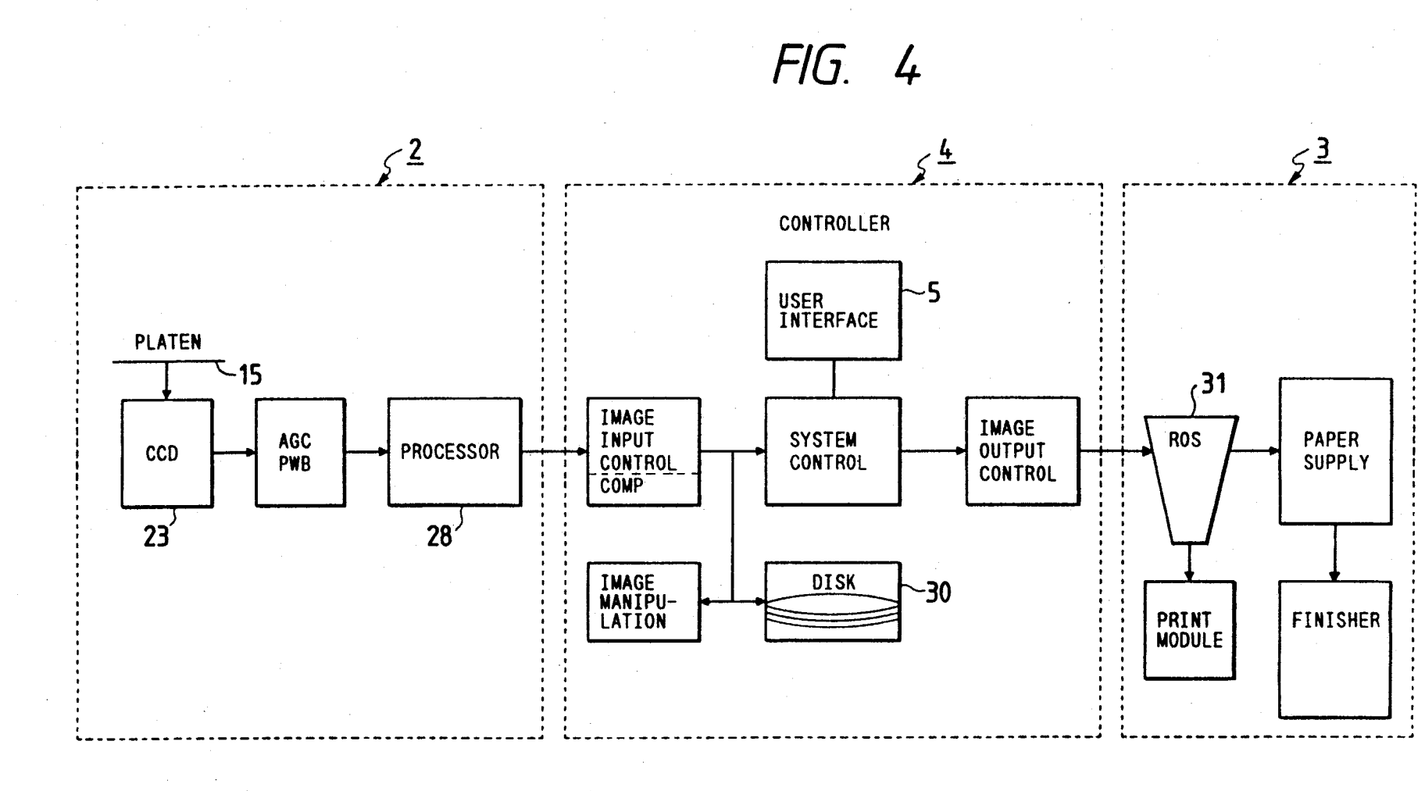
FIG. 4 is a block diagram showing the configuration of the IIT and the IOT.

The image information of the document 11 read by the image sensor array 23 of the scanner 20 is supplied to a processor 28 so as to be subject to fundamental processing such as zigzag correction and the like, and then supplied to the IOT 3, as shown in FIG. 4.

After being subject to secondary image processing (if necessary), the image information received by the IOT 3 is stored in a storage unit 30 constituted by a hard disk, a semiconductor memory, or the like. The image information may be read out from the storage unit 30 in predetermined order on the basis of an instruction from the UI 5 provided in the CONT 4. The image information read out from the storage 30 is converted into an optical signal and is supplied by a raster output scanner (hereinafter abbreviated to an "ROS") unit 31 onto a photoreceptor belt 32 through scanning exposure, as shown in FIG. 4.

The ROS unit 31 comprises a semiconductor laser 33 and a polygonal mirror 34. As shown in FIG. 2, a beam from the semiconductor laser 33 is reflected by reflection surfaces of the polygonal mirror 34 so as to be led onto the photoreceptor belt 32 over a predetermined scanning range.

The ROS unit 31 is arranged so that a laser beam Bm emitted from the semiconductor laser 33, which oscillates in accordance with the image information, is scanned by the polygonal mirror 34 in the axial direction of the photoreceptor belt 32. Thus, an image corresponding to the image information is transferred onto the photoreceptor belt 32 through scanning exposure.

After the photoreceptor belt 32 is uniformly electrically charged in advance by primary chargers 35 so as to have a predetermined electrical potential, an image is applied onto the photoreceptor belt 32 by means of the ROS unit 31 through scanning exposure as described above. Thus, an electrostatic latent image is formed on the surface of the photoreceptor belt 32.

The electrostatic latent image is developed by a developing device 36 that forms a toner image using black toner. Then, the toner image formed on the photoreceptor belt 32 is transferred, by electrification of a transfer charger 41, from the photoreceptor belt 32 onto recording paper 40. Recording paper 40 has a predetermined size and is supplied from one of a plurality of paper supply cassettes 37, 38, ..., provided in the IOT body. The recording paper 40 on which the toner image has been transferred is separated form the photoreceptor belt 32 by electrification by means of a separation charger 42, and conveyed to a fusing device. Thus, the toner image is fused and fixed on the recording paper 40.

After the completion of the transfer step, the surface of the photoreceptor belt 32 is cleaned by a cleaner 44 so that residual toner, paper powder, and the like are removed. The surface of the photoreceptor belt 32 is electrified by a static eliminator 45 so that residual charge thereon is eliminated. Thus, the photoreceptor belt 32 is made ready for the next image recording process.

The recording paper 40 on which the toner image has been fused as described above is discharged onto a discharge tray 46 in the case of a normal (simplex) copy mode.

In the double-side (duplex) copy mode, unlike a one-side multiple copy mode or the like, the recording paper 40 on which the toner image has been fused is not discharged as it is. Instead, it is conveyed to the transfer section again through a conveying path 47 unlike a paper turn-over mechanism 48. In the state where the recording paper 40 is left as it is or the recording paper 40 is inverted, a predetermined toner image is transferred and fused. After repetition of such transferring and fusing of predetermined images, the recording paper 40 is discharged for the first time onto the discharge tray 46.

Figure 5:
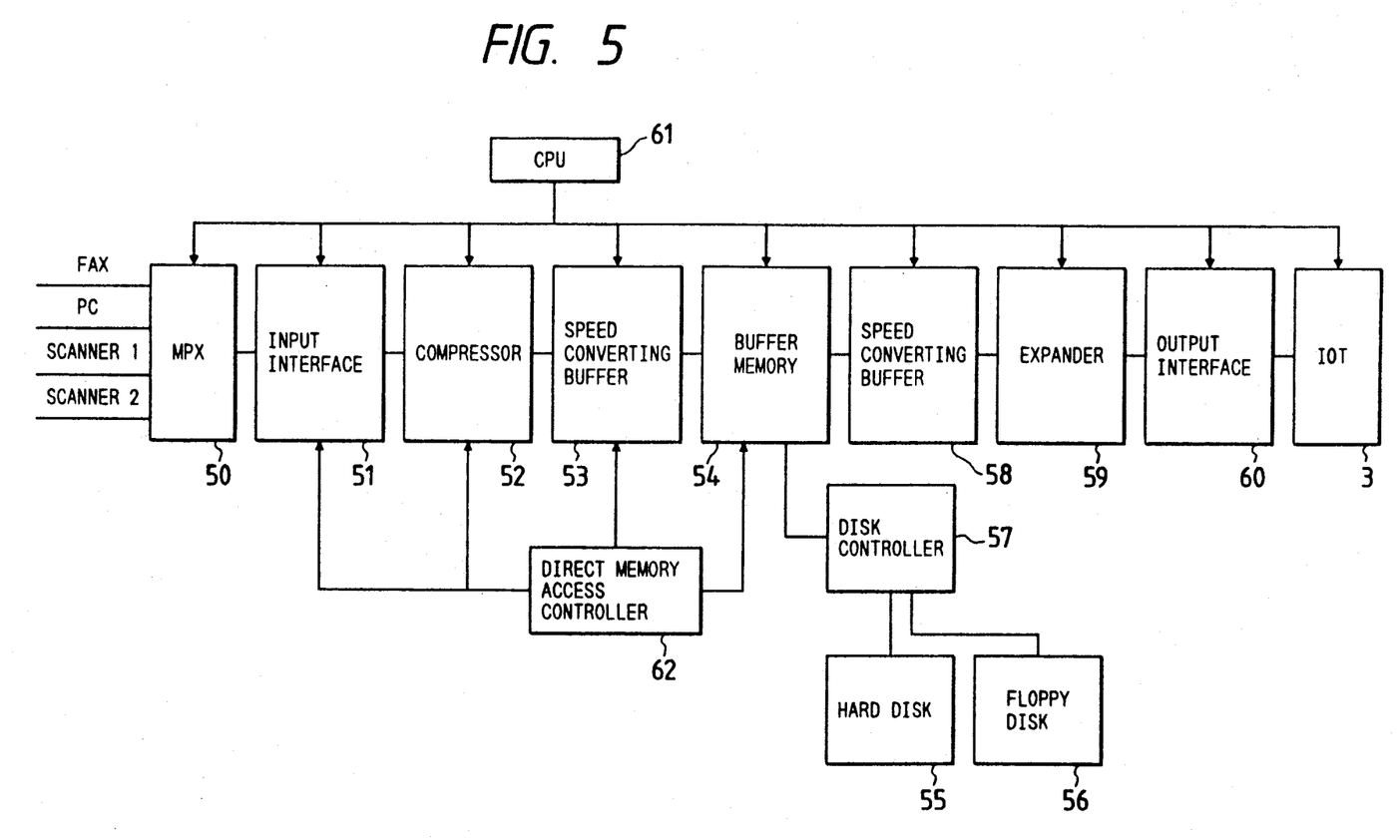
FIG. 5 is a block diagram showing an embodiment of the image processing apparatus according to the present invention.

FIG. 5 is a block diagram showing the configuration of an embodiment of the image processing apparatus according to the present invention which is applied to the digital copying machine having a configuration as described above.

In the drawing, the image processing apparatus includes a multiplexer (hereinafter "MPX") 50 for selecting image information supplied from the scanner 20 of the IIT 20, a facsimile machine, and a personal computer. More specifically, the MPX 50 is arranged to select the image information supplied from a first scanner for reading a black-and-white image, a second scanner for reading a color image, a facsimile machine, and a personal computer to perform parallel selection processing of the image information.

The image processing apparatus further includes an input interface 51 for receiving image information selected by the MPX 50. A compressor 52 performs predetermined compression processing on the image information supplied from the input interface 51. A speed converting buffer 53 constituted by a FIFO or the like converts the transfer speed of the image information compressed by the compressor 52. A buffer memory 54 temporarily stores the image information supplied through the speed converting buffer 53. Hard disk 55 and floppy disks 56 store the image information supplied from the buffer memory 54. A disk controller 57 controls the storage operation of the hard disk 55 and the floppy disk 56 The hard disk 55, the floppy disk 56, and the like, store the image information that has been temporarily stored in the buffer memory 54.

The image processing apparatus further includes a speed converting buffer 58, such as a FIFO or the like, that adjusts the transfer speed of image information read out from the hard disk 55 or the floppy disk 56. An expander 59 expands the compressed image information that has been stored in the hard disk 55 or the floppy disk 56 so as to recover the original image information. An output interface 60 outputs the image information expanded by the expander 59. The IOT 3 records the image information supplied from the output interface 60 after performing secondary processing on the image information, as necessary, and outputs the recorded image information.

A CPU 61 controls the operation of the MPX 50, the input interface 51, the compressor 52, the speed converting buffer 53, the buffer memory 54, the speed converting buffer 58, the expander 59, the output interface 60, the IOT3, etc.

A direct memory access controller 62 (hereinafter abbreviated to a "DMA" controller) may control the data transfer operation of the input interface 51, the compressor 52, the speed converting buffer 53, the buffer memory 54, etc., in place of the CPU 61.

It is a matter of course that the CPU 61 may control the data transfer operation of the input interface 51, the compressor 52, the speed converting buffer 53, the buffer memory 54, etc. If the CPU 61 controls the data transferring operations, however, the CPU 61 cannot perform other processing in this period. Therefore, the DMA controller 62 controls the data transfer operations in place of the CPU 61 so that processing can be performed at a high speed.

Thus, in the above described digital copying machine, image processing is performed in the image copying operation or the like in a manner as follows. When documents 11 are to be copied by the digital copying machine, an operator sets the documents 11 in the document feed tray 12 of the ADF 5. The keyboard 6 of the UI 5 is then operated to designate the kind of copying operations to be performed, and the operator then pushes a start button to start the copying operation.

Pre-scanning for detecting the compression ratio of the image of the document 11 is performed in a full scale mode prior to the reading operation for copying the image of the document 11. In the pre-scanning, the first page of the documents 11 is conveyed by the ADF 5 onto the platen 15 of the IIT body. Image information of the first page of document 11 is then read by the scanner 20.

The image information read by the scanner 20 is selectively transferred to the compressor 52 through the MPX 50 and the input interface 51, as shown in FIG. 5, so as to be subject to predetermined compression processing. The image information compressed by the compressor 52 is temporarily stored in the buffer memory 54 after the image information transfer speed has been converted by the speed converting buffer 53.

Figure 6:
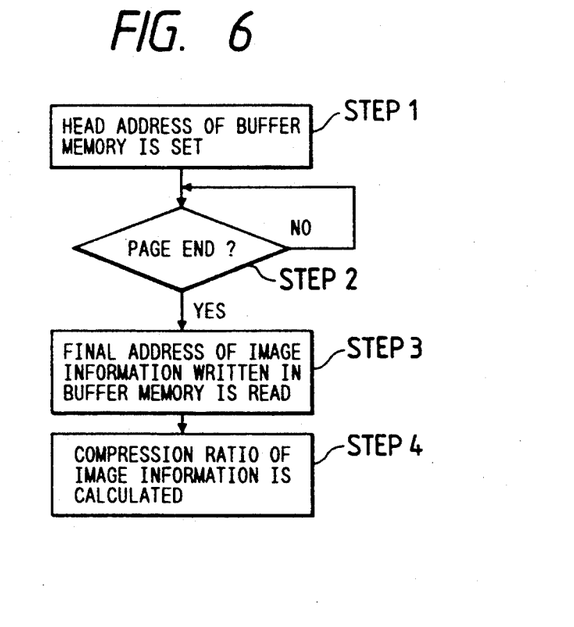
FIG. 6 is a flow chart showing the operation an image processing apparatus according to an embodiment of the present invention.
Figure 7:
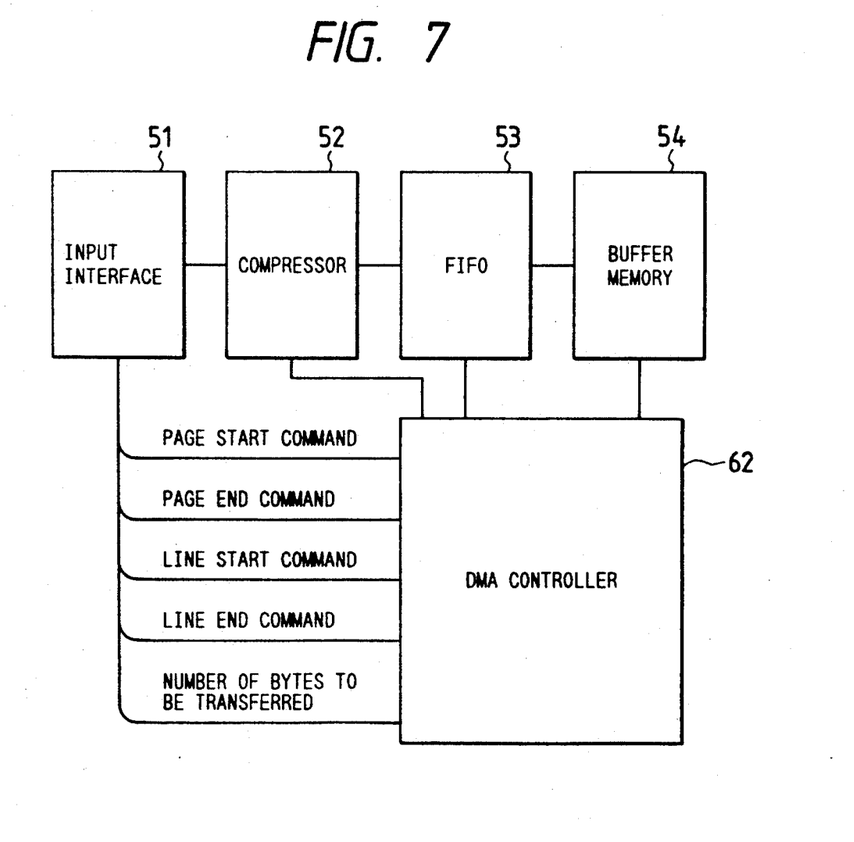
FIG. 7 is a block diagram showing an essential portion of the above image processing apparatus.

At this time, upon the start of the pre-scanning operation, the CPU 61 reads in a write command from a program memory. On the basis of the write command, the CPU 61 informs the DMA controller 62 of the head address of the buffer memory 54 in which the compressed image information is to be stored (step 1), as shown in FIG. 6. Then, the DMA controller 62 supplies a signal to the input interface 51 to designate the quantity of image information to be sent to the compressor 52. The designation of the quantity of image information is performed on the basis of a page start command, a page end command, a line start command, a line end command, and a command showing the number of bytes to be transferred. These commands are issued from the DMA controller 62 to the input interface 51, as shown in FIG. 7.

Next, the DMA controller 62 supplies a signal to the speed converting buffer 52 and the buffer memory 54 so that the image information which has been predeterminedly compressed by the compressor 52 is stored in the addresses of the buffer memory 54 successively from the head address designated by the CPU 61. The DMA controller 62 generates the addresses when the compressed image information is successively written into the buffer memory 54.

During the storage operation, the DMA controller 62 makes a judgment as to whether the input of the image information for one page of the documents 11 has been completed or not. That is, the DMA controller 62 determines whether the page end command of the first page has been generated or not (step 2).

The CPU 61 reads in the final address of the image information written in the buffer memory 54 upon the completion of the input of the image information for one page (step 3), and calculates the compression ratio of the image information corresponding to one page of the documents 11 (step 4).

The calculation for the compression ratio is performed by dividing the quantity (B) of the compressed image information written in the buffer memory 54 by the quantity (A) of the noncompressed image information to be supplied to the compressor 52. The quantity (A) of the non-compressed image information to be supplied to the compressor 52 may be obtained by counting, by means of a down counter or the like, the signal supplied from the DMA controller 62 to the interface 51. This is because the DMA controller 62 supplies the image information of the document 11 to the compressor 52 through the interface 51. The quantity (B) of the compressed image information written in the buffer memory 54 may be obtained from the head address of the buffer memory 54 designated from the CPU 61 to the DMA controller 62, and the final address of the buffer memory 54 which is read in upon the completion of the input of the image information for one page of the documents 11 (step 3 of FIG. 6).

The CPU 61 obtains the quantity (A) of the non-compressed image information to be supplied to the compressor 52 and the quantity (B) of the compressed image information written in the buffer memory 54 as described above to calculate the compression ratio (B/A) by dividing the quantity (B) of the image information written in the buffer memory 54 by the quantity (A) of the image information to be supplied to the compressor 52. Then, the CPU 61 determines the storage capacity which must be secured in the buffer memory 54 for use for a scanner on the basis of the calculated value of the compression ratio. More specifically, the storage capacity to be secured in the buffer memory 54 for use for a scanner is calculated on the basis of the compression ratio of the document 11. The compression ratio is obtained (as discussed above) by use of a predetermined operational formula. For example, in the predetermined operational formula, the compression ratio (as obtained above) of the document 11 is multiplied by a predetermined factor to make it possible to secure a sufficiently large storage capacity for temporarily storing the image information of the document 11.

Having obtained the compression ratio of the image information of the document 11 through pre-scanning and having determined the storage capacity to be secured in the buffer memory 54 for use for a scanner as described above, the CPU 61 performs distribution of the recording region in the buffer memory 54. The distribution of the recording region of the buffer memory 54 is performed under control of upper bits of the memory address of the buffer memory 54 on the basis of a control signal from the CPU 61.

Figure 8:
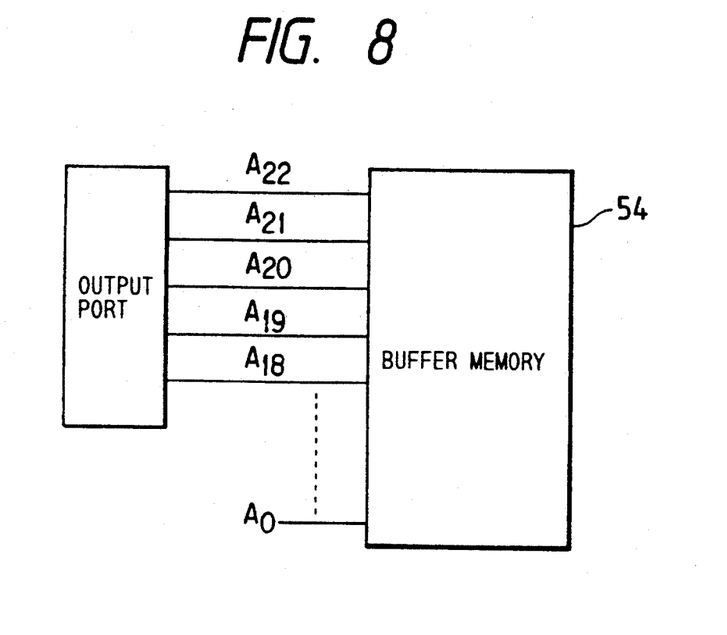
FIG. 8 is an explanatory view showing the buffer memory.
Figure 9:
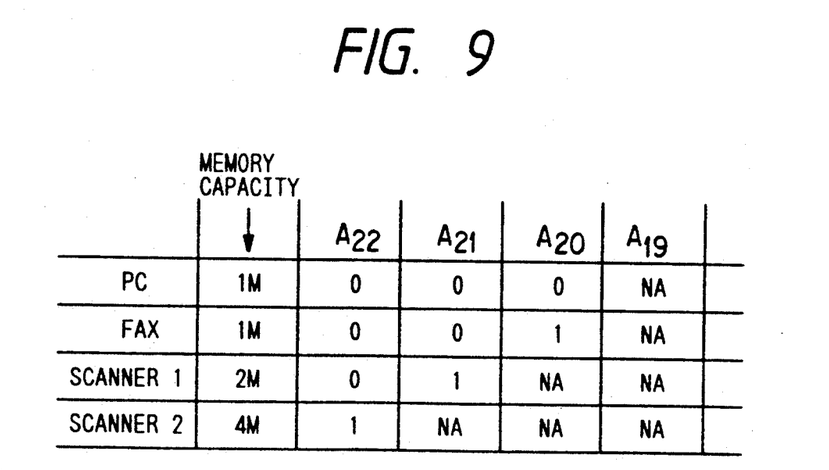
FIG. 9 is an explanatory view showing the state of the buffer memory in which the storage region is distributed.

In this embodiment, the buffer memory 54 is provided with output ports $A_0$–$A_{22}$ as shown in FIG. 8. In order to secure, for example, storage capacity of 2 MB for a first scanner, the CPU 61 writes a control signal of "01" in the upper two bits $A_{22}$ and $A_{21}$ of the output ports $A_0$–$A_{22}$, as shown in FIG. 9. Thus, the storage capacity of 2 MB from $A_0$ to $A_{20}$ can be secured for the first scanner in the buffer memory 54. In FIG. 9, NA represents a storable memory region.

Further, in order to secure storage capacity of 4 MB for a second scanner, a control signal of "1" is written in the most significant bit $A_{22}$ of the output ports $A_0$–$A_{22}$ of the buffer memory 54, so that the storage capacity of 4 MB from $A_0$ to $A_{21}$ can be secured for the second scanner in the buffer memory 54. Moreover, in order to secure storage capacity of 1 MB for a facsimile machine or a personal computer, a control signal of "000" or "001" is written in the upper three bits $A_{22}$, $A_{21}$, and the storage capacity of 1 MB from $A_0$ to $A_{19}$ can be secured for the facsimile equipment or the personal computer in the buffer memory 54.

Then, the image reading operation is carried out for copying the image of the document 11. In this main scanning, the first document 11 is conveyed onto the platen 15 of the IIT body by the ADF 5. The image information of the document 11 is then read by the scanner 20.

The image information of the document 11 read by the scanner 20 is selectively transferred to the compressor 52 through the MPX 50 and the input interface 51 so as to be compressed by the compressor 52, as shown in FIG. 5. Then, the image information compressed by the compressor 52 is temporarily stored in the buffer memory 54, after the image information transfer speed has been converted by the speed converting buffer 53. At this time, a storage range, sufficient to store the image information for one page of the document 11 read by the scanner 20 and compressed by the compressor 52, is secured in the buffer memory 54. The image information temporarily stored in the buffer memory 54 is then stored in the hard disk 55 under the control of the disk controller 57.

The above operation is repeated until all the documents 11 set on the document feed tray 12 of the ADF 10 have been read by use of the scanner 20 by an operator and then stored in the compressed state in the hard disk 55.

Then, in the digital copying machine, the image information stored in the hard disk 55 is read in a predetermined order from the hard disk 55 through the buffer memory 54, the speed converting buffer 58, the expander 59, and the output interface 60 in accordance with an instruction from the UI 5 provided in the CONT 4. The image information is then subject to predetermined image copying operation by means of the IOT 3.

As described above, the compression ratio of the document 11 to be read by the scanner 20 is detected in advance through prescanning and the storage region of the buffer memory 54 to be used for various functions such as for scanners or for a facsimile machine function and the like, can be set in accordance with the detected compression ratio of the document 11. Accordingly, the storage region of the buffer memory 54 can be distributed in accordance with the compression ratio of the document 11. Thus, image information of the document 11 is read through the scanner 20 for performing a copying operation. Therefore, it is possible to secure the storage region of the buffer memory 54 assigned for the scanner so that the image information of the document 11 supplied can be stored from the compressor 52 into the buffer memory 54 even when the compression ratio of the document 11 in the compressor 52 is low.

In reading the image information of the document 11 through the scanner 20, therefore, the storage region of the buffer memory 54 assigned for a scanner will never become full. Thus, interruption of the reading operation of the document 11 by the scanner 20 is prevented. Because the reading operation will not be interrupted, it will not be necessary to set document 11 again on the ADF 10 in order to be read again. Thus, the operation for reading the document 11 can be performed easily and surely.

Since the compression ratio of the document 11 by the compressor 52 can be changed in accordance with the kind of document 11, the rate of use of the buffer memory 54 can correspondingly be changed in accordance with the kind of the document 11 to be read by the scanner 20 as described above. Therefore, even in the case where only a small portion of storage region of the buffer memory 54 is assigned to a scanner (for example, in the case of reading a document 11 with a high compression ratio) the storage region, can also be assigned to a facsimile machine and a personal computer. Therefore, the whole buffer memory 54 can be efficiently used.

Buffer memory 54, therefore, need not be a memory having excessively large storage capacity in order to prevent interruption of the document reading operation by means of the scanner 20 as discussed above. Accordingly, it is possible to reduce the cost of the image processing apparatus.

Although description has been made as to the case where the detection of the document compression ratio is carried out through pre-scanning in a full scale mode in the foregoing embodiment, the present invention is not limited to this. Alternatively, the prescanning may be performed in a reduced-scale mode so that the time taken for the pre-scanning when the document compression ratio is detected, can be reduced correspondingly.

Further, although description has been made as to the case where pre-scanning is performed through normal scanning operation in detecting the document compression ratio, the present invention is not limited to this. Alternatively, the pre-scanning for detection of the document compression ratio may be carried out in back-scanning so as to further reduce the time taken for scanning for the detection of the document compression ratio.

The present invention is constituted by the above configuration and operation, in which the compression ratio of a document to be read in by a scanner is detected in advance so as to make it possible to properly set storage regions in a buffer memory for use for various functions, such as a scanner, a facsimile machine, etc. Accordingly, it is possible to prevent interruption from occurring in document reading operation and it is possible to use the storage region of the buffer memory efficiently.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image recording apparatus comprising
an external image data input section providing image data;
an image reading section for reading images of documents and generating corresponding image data;
data compression means for compressing image data generated by said image reading section according to a compression ratio;
data storage means having a predetermined data memory space for storing said image data compressed by said data compression means;
data storage region management means for managing a plurality of data storage regions in said data storage means for the image data provided by said external image data input section and for the image data generated by said image reading section, wherein each one of said plurality of data storage regions is allocated a portion of said data memory space;
compression ratio detection means for detecting the compression ratio of the image data generated by said image reading section and compressed by said data compression means; and
control means for changing the portion of said data memory space allocated for at least one of said plurality of data storage regions in said data storage means for the image data generated by said image reading section in accordance with the compression ratio detected by said compression ratio detection means.

2. The image recording apparatus according to claim 1, wherein said compression ratio detection means is adapted to detect the compression ratio for every page of each document read by said image reading section.

3. The image recording apparatus according to claim 2, wherein said control means is adapted to change the portion of data memory space for at least one of said plurality of data storage regions in said data storage means in accordance wtih the compression ratio detected by said compression ratio detection means and in accordance with a predetermined safety factor 4. The image recording apparatus according to claim 1, wherein said compression ratio detection means is adapted to detect the compression ratio based on the first page of each document read by said image reading section.

5. The image recording apparatus according to claim 4, wherein said control means is adapted to change the portion of data memory space for at least one of said plurality of data storage regions in said data storage means in accordance with the compression ratio detected by said compression ratio detection means and in accordance with a predetermined safety factor.

6. The image recording apparatus according to claim 1, wherein said compression ratio detection means is adapted to detect the compression ratio for all pages of a job read by said image reading section.

7. The image recording apparatus according to claim 6, wherein said control means is adapted to change the portion of data memory space for at least one of said plurality of data storage regions in said data storage means in accordance wtih the compression ratio detected by said compression ratio detection means and in accordance with a predetermined safety factor.

8. The image recording apparatus according to claim 1, wherein said compression ratio detection means is adapted to detect the compression ratio during a pre-scanning period of said image reading section.

9. The image recording apparatus according to claim 1, wherein said compression ratio detection means is adapted to detect the compression ratio during a reduction mode operation of said image reading section.

10. An image recording apparatus comprising:
a first image data input section for inputting first image data related to an image;
a second image data input section for inputting second image data related to an image;
data compression means for compressing said first and second image data input by said first and second image data input sections according to a compression ratio;
data storage means having a predetermined data memory space for storing said first and second image data;
data expansion means for expanding said first and second image data compressed by the data compression means and for outputting said expanded first and second data;
data storage region management means for managing a plurality of data storage regions in said data storage means for said first image data from said first image data input section and for said second image data from said second image data input section, wherein each one of said plurality of storage regions is allocated a portion of said data memory space;
compression ratio detection means for detecting the compression ratio of said first and second image data; and
control means for changing the portion of said data memory space allocated for at least one of said plurality of data storage regions in said data storage means for said first image data input by said first image data input section in accordance wtih the compression ratio detected by said compression ratio detection means.

11. The image recording apparatus according to claim 10, wherein said compression ratio detection means is adapted to detect the compression ratio for every page of the first image data input by said first image data input section.

12. The image recording apparatus according to claim 11, wherein said control means is adapted to change the portion of data memory space for at least one of said plurality of data storage regions in said data storage means in accordance wtih the compression ratio detected by said compression ratio detection means and in accordance wtih a predetermined safety factor.

13. The image recording apparatus according to claim 10, wherein said compression ratio detection means is adapted to detect the compression ratio for the fist page of the first image data input by said first image data input section.

14. The image recording apparatus according to claim 13, wherein said control means is adapted to change the portion of data memory space for at least one of said plurality of data storage regions in said data storage means in accordance with the compression ratio detected by said compression ratio detection means and in accordance with a predetermined safety factor.

15. The image recording apparatus according to claim 10, wherein said compression ratio detection means is adapted to detect the compression ratio on all pages of a job input by said first image data input section.

16. The image recording apparatus according to claim 15, wherein said control means is adapted to change the portion of data memory space for at least one of said plurality of data storage regions in said data storage means in accordance with the compression ratio detected by said compression ratio detection means and in accordance with a predetermined safety factor.

17. An image recording apparatus adapted to receive image data from at least one external source, and from an image reading section for reading images on documents and generating corresponding image data, comprising
data compression means for compressing image data generated by said image reading section in accordance with a variable compression ratio;
a data storage buffer having a predetermined data memory space for temporarily storing image data;
data storage region management means for managing a plurality of data storage regions in said data storage buffer, wherein each one of said plurality of data storage regions is allocated a portion of said data memory space and wherein each one of said plurality of data storage regions is designated to store image data from one of the image data reading section and the at least one external source of image data;
compression ratio detection means for detecting the compression ratio of the image data generated by said image reading section and compressed by said data compression means; and
control means for changing the portion of said data memory space allocated for at least one of said plurality of data storage regions in said data storage buffer for the image data generated by said image reading section in accordance with the compression ratio detected by said compression ratio detection means.

18. The image recording apparatus according to claim 17, comprising an input section for selecting between and receiving image data from one of the image reading section and the at least one external source of image data.

19. The image recording apparatus according to claim 17, wherein the at least one external source of image data includes a facsimile machine.

20. The image recording apparatus according to claim 17, wherein the at least one external source of image data includes a personal computer.

* * * * *

UNITED STATES PATENT AND TRADEMARK OFFICE
CERTIFICATE OF CORRECTION

PATENT NO. : 5,208,676
DATED : May 04, 1993
INVENTOR(S) : Tetsuyuki Inui

It is certified that error appears in the above-indentified patent and that said Letters Patent is hereby corrected as shown below:

Claim 3, column 12, line 45, change "wtih" to --with--.

Claim 13, column 13, line 60, change "fist" to --first--.

Signed and Sealed this

Twelfth Day of April, 1994

Attest:

BRUCE LEHMAN

*Commissioner of Patents and Trademarks*

*Attesting Officer*